(12) United States Patent
Kimura et al.

(10) Patent No.: US 7,966,903 B2
(45) Date of Patent: Jun. 28, 2011

(54) SHIFT RANGE CONTROL APPARATUS

(75) Inventors: Kiyoshi Kimura, Obu (JP); Taku Itoh, Chita-gun (JP); Shigeru Yoshiyama, Kariya (JP)

(73) Assignees: Denso Corporation, Kariya (JP); Toyota Jidosha Kabushiki Kaisha, Toyota (JP)

( * ) Notice: Subject to any disclaimer, the term of this patent is extended or adjusted under 35 U.S.C. 154(b) by 676 days.

(21) Appl. No.: 12/120,321

(22) Filed: May 14, 2008

(65) Prior Publication Data

US 2008/0302628 A1      Dec. 11, 2008

(30) Foreign Application Priority Data

Jun. 8, 2007   (JP) ................. 2007-152927

(51) Int. Cl.
| | |
|---|---|
| F16H 3/38 | (2006.01) |
| F16H 59/00 | (2006.01) |
| F16H 61/00 | (2006.01) |
| F16H 63/00 | (2006.01) |
| B60K 20/00 | (2006.01) |
| B60K 17/04 | (2006.01) |
| B60K 17/12 | (2006.01) |
| B62K 25/00 | (2006.01) |
| B62K 25/02 | (2006.01) |

(52) U.S. Cl. ............... 74/335; 74/473.12; 74/473.13; 74/473.14; 74/473.15; 74/473.21; 74/473.26; 74/339

(58) Field of Classification Search ............ 74/335, 74/473.12, 473.13, 473.14, 473.15, 473.21, 74/473.23–473.26, 339
See application file for complete search history.

(56) References Cited

U.S. PATENT DOCUMENTS

| | | | | |
|---|---|---|---|---|
| 5,179,868 | A * | 1/1993 | Thibeault | 74/411.5 |
| 6,588,294 | B1* | 7/2003 | Rogg | 74/473.21 |
| 6,752,036 | B2 | 6/2004 | Kropp et al. | |
| 6,918,314 | B2* | 7/2005 | Wang | 74/335 |
| 6,983,668 | B2* | 1/2006 | Powell et al. | 74/335 |
| 7,374,511 | B2* | 5/2008 | Berger et al. | 477/99 |
| 2008/0039282 | A1 | 2/2008 | Yoshiyama et al. | |
| 2009/0158877 | A1* | 6/2009 | Vernacchia et al. | 74/473.24 |

FOREIGN PATENT DOCUMENTS

| | | |
|---|---|---|
| JP | 4-84073 | 7/1992 |
| JP | 05-296339 | 11/1993 |
| JP | 2003-049942 | 2/2003 |

OTHER PUBLICATIONS

Japanese Office Action dated Apr. 28, 2009, issued in corresponding Japanese Application No. 2007-152927, with English translation.
Kimura et al., U.S. Appl. No. 11/957,696 filed Dec. 17, 2007, corresponding to JP 2007-12821.

* cited by examiner

*Primary Examiner* — Tisha D Lewis
(74) *Attorney, Agent, or Firm* — Nixon & Vanderhye PC (57) ABSTRACT

A rod-lock mechanism is provided in an automatic transmission for a vehicle. The rod-lock mechanism has an engaging pin which will be engaged with a rod when the rod is in its initial position, so as to hold the rod in its initial position. The rod-lock mechanism further has an electric actuator for driving the engaging pin when electric power is supplied, so that the engaging pin is brought out of engagement from the rod. A forced parking current supply unit controls electric power supply to the electric actuator. When the electric power is supplied to the electric actuator, the rod is moved in a direction of a parking position to bring a vehicle into a parking condition.

7 Claims, 5 Drawing Sheets

SHIFT RANGE CONTROL APPARATUS

CROSS REFERENCE TO RELATED APPLICATION

This application is based on Japanese Patent Application No. 2007-152927, which is filed on Jun. 8, 2007, the disclosure of which is incorporated herein by reference.

FIELD OF THE INVENTION

The present invention relates to a shift range control apparatus, which operates a shift range changing device and a parking condition setting device by an SBW (shift-by-wire) actuator, in particular relates to a technology for changing a shift position of an automatic transmission device to a parking position without current supply to an electric motor for the SBW actuator.

BACKGROUND OF THE INVENTION

A conventional automatic transmission device for a vehicle has a shift range changing device and a parking condition setting device, wherein a shift range (including a parking condition) is manually changed by a vehicle driver. Recently, a shift range control apparatus, such as disclosed in Japanese PCT Patent Publication No. 2004-513307, has been brought into a market, according to which a shift range changing device and a parking condition setting device are operated by an SBW actuator.

In the above SBW actuator of the shift range control apparatus, rotational force is produced by an electric motor. Accordingly, if any failure for current supply occurred, in which current supply from a vehicle battery to the electric motor is cut off due to any reason, the SBW actuator can no longer operate.

It may be possible to provide an additional battery (e.g. a capacitor) to operate the electric motor of the SBW actuator, just in case that the failure of the current supply from the vehicle main battery occurred.

In the case, however, that such an additional battery (e.g. the capacitor) is provided to operate the electric motor of the SBW actuator and to thereby drive the shift range changing device and the parking condition setting device, a large capacity is necessary for the additional battery (capacitor). Namely, the capacitor having the large capacity must be mounted on a vehicle, which would cause an increase of cost.

SUMMARY OF THE INVENTION

The present invention is made in view of the above problems. It is an object of the present invention to provide a shift range control apparatus, which can bring a parking condition setting device to its parking condition by operating an SBW actuator with a smaller amount of electric power, without current supply control for the electric motor of the SBW actuator.

According to a feature of the present invention, a shift range control apparatus for a vehicle automatic transmission has; a shift range changing mechanism (3) for changing a shift range of the automatic transmission; a parking condition setting mechanism (4) for changing a parking condition of the vehicle from a parking setting position to a parking releasing position and vice versa; and a shift-by-wire actuator (1) for switching an operational mode from the shift range changing mechanism (3) to the parking condition setting mechanism (4) and vice versa.

Furthermore, the shift range control apparatus has a forced parking mechanism (81), which comprises; a rod (84) movably supported between an initial position and a final operational position; a spring (85) for biasing the rod (84) toward the final operational position; and an interlocked portion (33) rotated together with an output shaft (17) of the shift-by-wire actuator (1). The rod (84) does not interfere with the interlocked portion (33) when the rod (84) is in the initial position, whereas the rod (84) is brought into engagement with the interlocked portion (33) when the rod (84) is moved from the initial position to the final operational position, so that the interlocked portion (33) and the output shaft (17) are driven to the parking setting position.

Furthermore, the shift range control apparatus has a rod-lock mechanism (82), which comprises; an engaging pin (93) engaged with the rod (84) when the rod (84) is in the initial position and for holding the rod (84) in the initial position; and an electric actuator (94) for driving the engaging pin (93) when electric power is supplied, so that the engaging pin (93) is brought out of engagement from the rod (84).

Furthermore, the shift range control apparatus has a forced parking current supply unit (83) for controlling supply of the electric power to the electric actuator (94).

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

A shift range control apparatus has a shift range changing device provided on an automatic transmission device, a parking condition setting device, an SBW actuator for driving the shift range changing device and the parking condition setting device, a forced parking device, a rod-lock device, and a current supply device for the forced parking device.

The forced parking device has a rod movably supported and movable between its initial position and its final operational position, a spring biasing the rod toward the final operational position, and an interlocked member rotatable with an output shaft of the SBW actuator. When the rod is in its initial position, the rod does not interfere with the interlocked member, whereas the rod is brought into engagement with the interlocked member when the rod is moved to its final operational position. When the rod is engaged with the interlocked member, the interlocked member as well as the output shaft is driven to move toward a parking position.

The rod-lock device has a locking member, which is engaged with the rod at the initial position to hold the rod at its initial position. The rod-lock device further has an electric actuator for releasing a locked condition of the locking member when the electric actuator is energized.

The current supply device for the forced parking device energizes the electric actuator, when a condition for a forced parking operation is met (for example, when a certain operation is carried out during a failure of the current supply, when a security system is started, and so on).

First Embodiment

A shift range control apparatus according to a first embodiment of the present invention will be explained with reference to FIGS. 1 to 6.

The shift range control apparatus has an SBW (shift-by-wire) actuator 1 (shown in FIGS. 1 to 3), which switches over an operation mode from a shift range changing device 3 (FIG. 5) to a parking condition setting device 4 (FIG. 5) or vice versa, wherein the shift range changing device as well as the parking condition setting device is mounted in an automatic transmission device 2 (FIG. 4) for changing speed of output force from a vehicle engine (not shown). The vehicle may have a normal internal combustion engine, or may have a combination of the internal combustion engine and an electric motor (so-called a hybrid engine).

Figure 4:
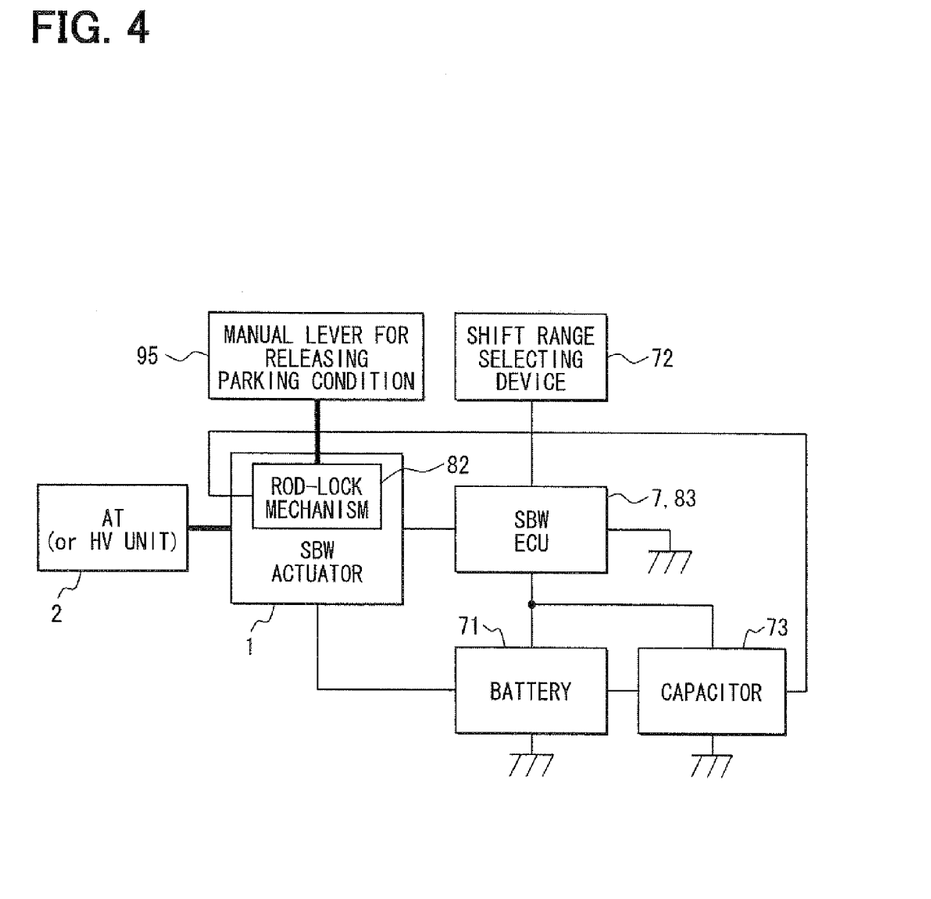
FIG. 4 is a schematic view showing a system structure of a shift range control apparatus.

The SBW actuator 1 is a servo mechanism for operating the shift range changing device 3 and the parking condition setting device 4. As shown in FIG. 13, the SBW actuator 1 has a synchronous electric motor 5 and a speed reduction device 6, which reduces a rotational speed of the electric motor 5 and outputs such speed-reduced rotational force. The rotational speed of the SBW actuator 1, that is, the rotational speed of the electric motor 5 is controlled by an SBW ECU 7 as shown in FIG. 4.

The shift range control apparatus controls a rotational direction, a rotational number and a rotational angle of the electric motor 5 by the SBW ECU 7, so that the shift range changing device 3 and the parking condition setting device 4 are changed from one to the other.

A more detailed structure of the shift range control apparatus will be explained. The SBW actuator 1 will be explained with reference to FIG. 1B, wherein a right-hand side of the drawing is referred to as a front side, and a left-hand side is referred to as a rear side only for the purpose of the explanation.

The electric motor 5 is a brushless type motor (SR motor: switched reluctance motor) having no permanent magnets, wherein the electric motor 5 is composed of a rotor 11 rotatably supported and a stator 12 co-axially arranged with the rotor 11.

The rotor 11 is composed of a rotor shaft 13 and a rotor core 14, wherein the rotor shaft 13 is rotatably supported by roller bearings 15 and 16 arranged at a front side and a rear side of the rotor shaft 13.

The front roller bearing 15 is inserted into and fixed to an inner periphery of an output shaft 17 of the speed reduction device 6. The output shaft 17 is rotatably supported by a metal bearing 19, which is arranged at an inner periphery of a front housing 18. Namely, a front side of the rotor shaft 13 is rotatably supported by the metal bearing 19 provided in the front housing 18, the output shaft 17 and the front roller bearing 15.

The stator 12 has a fixed stator core 21 and multiple excitation coils 22 of multiple phases for generating magnetic forces upon receiving current supply.

The stator core 21 is made of laminated thin metal sheets and fixed to a rear housing 20. More exactly, multiple stator teeth (inwardly extending magnetic poles) are formed at an inner periphery of the stator core 21 at a predetermined angle (e.g. 30°), each of which extends toward the rotor core 14. The excitation coils 22 are wound on the respective stator teeth for generating the magnetic force at the respective stator teeth. Current supply to the excitation coils 22 is controlled by the SBW ECU 7.

The rotor core 14 is likewise made of laminated thin metal sheets and press-fitted to the rotor shaft 13. Multiple rotor teeth (outwardly extending magnetic poles) are formed at an outer periphery of the rotor core 14 at a predetermined angle (e.g. 45°), each of which extends toward the stator core 21.

The position of the excitation coil 22 for which the electric current is supplied as well as the direction of the current supply to the excitation coil 22 is consecutively changed under the control of the SBW ECU 7, so that the stator teeth for magnetically attracting the rotor teeth are consecutively changed. As a result, the rotor 11 is rotated in one direction, or in the opposite direction.

Figure 6:
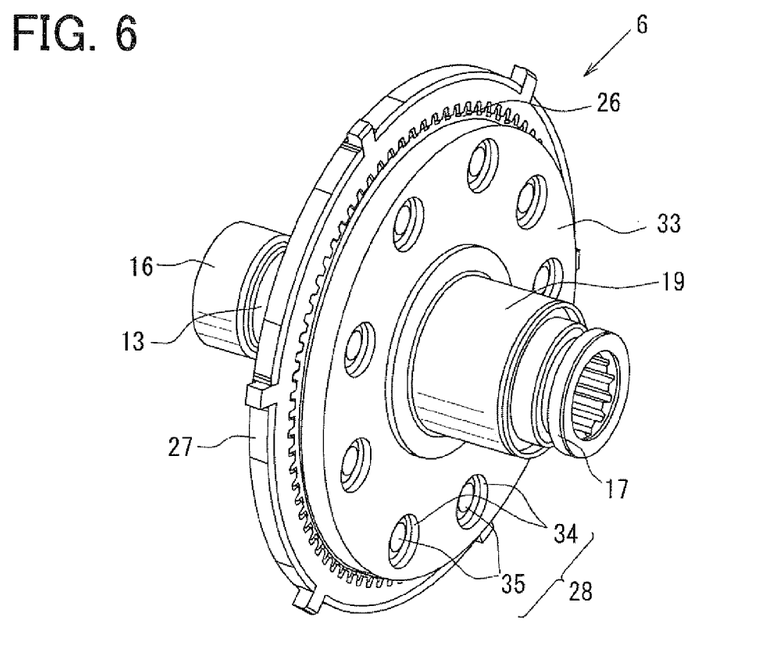
FIG. 6 is a perspective view showing a speed reduction gear device, when viewed from a front side.

The speed reduction device 6 will be explained with reference to FIGS. 1A and 1B and FIG. 6. FIG. 6 is just a reference drawing showing the speed reduction device 6, in which a pinion 87 (described below) is eliminated.

The speed reduction device 6 is a cycloid speed reduction device, which is a kind of a planetary gear train. The speed reduction gear device 6 has a sun gear 26 (an inner gear: an external gear) rotatably and eccentrically connected to the rotor shaft 13 via an eccentric portion 25 provided on the rotor shaft 13, a ring gear 27 (an outer gear: an internal gear) to be engaged with the sun gear 26, and transmitting portions 28 for transmitting only rotation of the sun gear 26 (a component of the rotation for the sun gear 26 on its axis) to the output shaft 17.

The eccentric portion 25 is a part of the rotor shaft 13, which is eccentrically rotated with respect to a rotational center of the rotor shaft 13, so that the sun gear 26 is rotated in an oscillating manner with respect to the rotor shaft 13. The eccentric portion 25 rotatably supports the sun gear 26 via a sun gear bearing 31 arranged at an outer periphery of the eccentric portion 25.

As explained above, the sun gear 26 is rotatably supported by the eccentric portion 25 of the rotor shaft 13 via the sun gear bearing 31. Therefore, the sun gear 26 is rotated while the sun gear 26 is pushed toward the ring gear 27.

The ring gear 27 is fixed to the front housing 18.

The transmitting portions 28 is composed of multiple pin holes 34 and multiple pins 35 loosely inserted into the respective pin holes 34, wherein the multiple pins 34 are formed on a flanged portion (also referred to as an interlocked member) 33 at an identical circumference, the flanged portion 33 is rotated together with the output shaft 17, and the multiple pins 35 are formed on the sun gear 26.

The multiple pins 35 are formed on a front side surface of the sun gear 26, so that the pins 35 project from the front side surface.

The multiple pin holes 34 are formed on the flanged portion 33 which is formed at a rear portion of the output shaft 17. The multiple pins 35 are inserted into the pin holes 34, so that the rotation of the sun gear 26 (the component of the rotation for the sun gear 26 on its axis) is transmitted to the output shaft 17.

As above, when the rotor shaft 13 is rotated, the sun gear 26 is eccentrically rotated so that the sun gear 26 is rotated in a reduced speed with respect to the rotor shaft 13, and such rotation of the sun gear 26 in the reduced speed is transmitted to the output shaft 17. The output shaft 17 is connected to a control rod 45 (explained below), which operates the shift range changing device 3 and the parking condition setting device 4.

The multiple pin holes 34 may be alternatively formed on the sun gear 26, whereas the multiple pins 35 may be formed on the flanged portion 33.

The shift range changing device 3 and the parking condition setting device 4 are switched over from one to the other by the output shaft of the SBW actuator 1 (i.e. the output shaft 17 of the speed reduction device 6).

Figure 5:
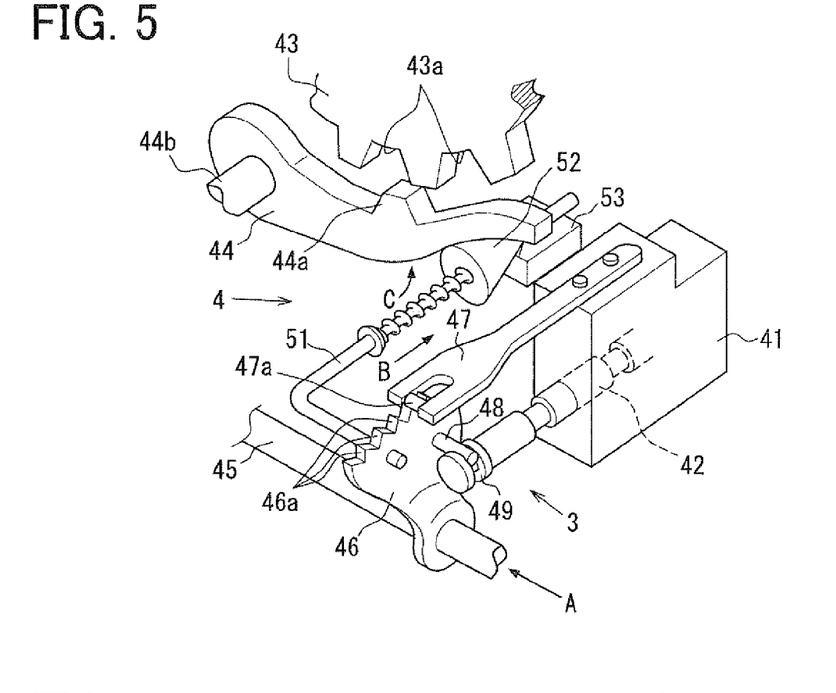
FIG. 5 is a perspective view showing a part of a parking condition setting device and a shift range changing device.

The shift range changing device 3 drives a manual spool valve 42, which is provided in a hydraulic valve body 41, to such a position corresponding to a selected shift range, in order to change hydraulic supply lines to hydraulic clutches (not shown) of the automatic transmission device 2 and thereby to control engaged conditions of the hydraulic clutches.

The parking condition setting device 4 drives a park pole 44 movably supported by a fixed portion (such as a housing of the automatic transmission device 2) to an engaged position with or a disengaged position from a parking gear 43, which is rotated together with a driving shaft (a drive shaft or the like) of the vehicle. As a result, a locked condition of the parking gear 43 (a parking condition of the vehicle) and an un-locked condition thereof (a condition released from the parking condition) is switched over from one to the other by the parking condition setting device 4. More exactly, the switching over between the locked condition and the un-locked condition of the parking condition setting device 4 is carried out by bringing a projected portion 44a of the park pole 44 into engagement with (or out of engagement from) a recessed portion 43a of the parking gear 43. When the rotation of the parking gear 43 is prohibited, the driving shaft of the vehicle is locked via the drive shaft, a differential gear and so on, so that a parking condition of the vehicle is achieved.

A fan-shaped detent plate 46 is provided on the control rod 45 operated by the speed reduction device 6, so that the detent plate 46 and the control rod 45 are moved (rotated) integrally with each other.

Multiple recessed portions 46a are formed at a radial-forward end (an arc portion of the fan-shaped plate) of the detent plate 46. A catching portion 47a formed at a forward end of a detent spring 47, which is fixed to the hydraulic valve body 41, is engaged with the recessed portion 46a, so that a selected shift range is held. In this embodiment, a detent mechanism is shown as having a plate spring. However, another type of the detent mechanism having a coil spring may be also used.

A pin 48 for driving the manual spool valve 42 is provided on the detent plate 46.

The pin 48 is engaged with a groove 49 formed at an end of the manual spool valve 42. When the detent plate 46 is driven to rotate by the control rod 45, the pin 48 is moved along a circular orbit, so that the manual spool valve 42 engaged with the pin 48 moves linearly in a reciprocating manner in the hydraulic valve body 41.

In the case that the control rod 45 is rotated in a clockwise direction when viewed in a direction of an arrow A in FIG. 5, the detent plate 46 pushes the manual spool valve 42 into the hydraulic valve body 41 via the pin 48, so that hydraulic pressure lines in the hydraulic valve body 41 are changed in an order of D, N, R and P. Namely, the shift range of the automatic transmission device 2 is changed in the order of D, N, R and P range.

In the case that the control rod 45 is rotated in the opposite direction, the pin 48 pulls the manual spool valve 42 from the hydraulic valve body 41, so that the hydraulic pressure lines in the hydraulic valve body 41 are likewise changed in an order of P, R, N and D. Namely, the shift range of the automatic transmission device 2 is changed in the order of P, R, N and D range.

A park rod 51 for driving the park pole 44 is provided on the detent plate 46. A conical portion 52 is formed at a forward end of the park rod 51. The conical portion 52 is interposed between a projected portion 53 of the housing for the automatic transmission device 2 and the park pole 44. In the case that the control rod 45 is rotated in the clockwise direction when viewed in the direction of the arrow A in FIG. 5, more particularly in the case that the control rod 45 is rotated to change the shift position from the R range to the P range, the park rod 51 is moved via the detent plate 46 in a direction of an arrow B in FIG. 5. Then, the conical portion 52 pushes up the park pole 44. The park pole 44 is thereby rotated around a shaft 44b in a direction of an arrow C in FIG. 5, so that the projected portion 44a of the park pole 44 is brought into engagement with the recessed portion 43a of the parking gear 43. As a result, the locked condition (the parking condition of the vehicle) is achieved by the parking condition setting device 4.

In the case that the control rod 45 is rotated in the opposite direction, more particularly in the case that the control rod 45 is rotated to change the shift position from the P range to the R range, the park rod 51 is pulled back in the opposite direction of the arrow B, so that a force for pushing up the park pole 44 disappears. The park pole 44 is biased by a helical torsion spring (not shown) in a direction opposite to an arrow C in FIG. 5. Therefore, when the park pole 44 is rotated in the direction opposite to the arrow C, the projected portion 44a of the park pole 44 is brought out of the engagement from the recessed portion 43a of the parking gear 43, so that the parking gear 43 is released from the locked condition. As above, the un-locked condition (the condition released from the parking condition) is achieved by the parking condition setting device 4.

An encoder 60 for detecting rotational angle of the rotor 11 is provided in an inside of the housing (the front housing 18 and the rear housing 20) for the SBW actuator 1, as shown in FIG. 1B. The electric motor 5 can be operated at a high rotational speed without step-out, when the rotational angle of the rotor 11 is detected by the encoder 60.

The encoder 60 is of an incremental type, and has a magnet 61 rotated together with the rotor 11 and a hole-IC 62. The hole-IC 62 is arranged in the rear housing 20 at a position opposing to the magnet 61 for detecting magnetic flux. For example, the hole-IC 62 may be composed of a hole-IC for detecting a rotational angle by detecting magnetic flux of the magnet 61 in which multiple magnetic poles are magnetized, and a hole-IC for detecting an index signal by detecting magnetic flux which is generated at every cycle in which current supply to the excitation coils 22 of the multiple phases is completed for one cycle. The hole-IC 62 is mounted on a printed circuit board 63 fixed to the rear housing 20.

The SBW ECU 7 is composed of a well known microcomputer, which has CPUs for processing control and calculation, a memory device (ROM, SRAM, EEPROM, RAM, etc.) for storing various programs and data, an input circuit, an output circuit, a battery circuit and so on. A coil driving circuit for the electric motor 5 may be provided in an inside or an outside of a casing for the SEW ECU 7.

As shown in FIG. 4, the SEW ECU 7 is connected not only to the SEW actuator 1 but also to an ignition switch (not shown), a battery (BATT) 71, a display device (not shown) for displaying to a vehicle driver a condition of the shift range control apparatus (the selected shift range), a shift range selecting device 72 operated by the vehicle driver, sensors (not shown) for detecting operational condition of the vehicle including a vehicle speed sensor, a braking switch, and so on.

The SBW ECU 7 has various kinds of control programs, for example, for controlling a rotor reading means for reading rotational speed, rotational number, and rotational angle of the rotor 11 from outputs of the encoder 60, and for controlling a normal control means, which controls the electric motor 5 so that the shift range recognized by the SBW ECU 7 may be coincide with the shift range selected by the shift range selecting device 72 operated by the vehicle driver.

The above normal control means is a control program, which decides the rotational direction, the rotational number and the rotational angle for the electric motor 5, based on the selected position (the selected shift range) of the shift range selecting device 72 operated by the vehicle driver, and which further controls current supply to the respective phases of the excitation coils 22 based on the above decided values, so that the rotational direction, number and angle for the electric motor 5 are controlled. More exactly, when the electric motor 5 is driven to rotate, the SBW ECU 7 carries out synchronous operation, according to which current supply to the multiple phases of the excitation coils 22 is switched over based on the rotational angle and so on of the rotor 11 detected by the encoder 60. The rotational direction, number and angle for the electric motor 5 are thus controlled, so that the switching over between the shift range changing device 3 and the parking condition setting device 4 is carried out via the speed reduction device 6.

As explained above, the electric motor 5 of the SBW actuator 1 is supplied with electric power in order to switch over the operation from the shift range changing device 3 to the parking condition setting device 4. Therefore, in the case that a failure for the electric power occurs, in which the electric power is no longer supplied to the electric motor 5 from the battery 71, the switching operation from the shift range changing device 3 to the parking condition setting device 4 can not be carried out.

It may be possible to provide an additional battery (a capacitor 73) to operate the electric motor 5 of the SBW actuator 1, just in case that the failure of the current supply from the main battery 71 occurred, so that the electric motor 5 can be driven by the electric power charged in the capacitor 73. In the case, however, that such an additional battery (the capacitor 73) is provided to operate the electric motor 5 of the SBW actuator 1 and to thereby switching over the operation from the shift range changing device 3 to the parking condition setting device 4, a large capacity is generally necessary for the additional battery (capacitor 73). Namely, the capacitor 73 is likely to have a large capacity, which may cause an increase of cost.

According to the present embodiment, a forced parking device is provided to the SBW actuator 1.

The forced parking device is composed of a forced parking mechanism 81 for driving the SBW actuator 1 by use of restoring force of a spring (without operating the electric motor 5) in order to switch over the operation from the shift range changing device 3 to the parking condition setting device 4, a rod-lock mechanism 82 for operating the forced parking mechanism 81, and a forced parking current supply unit 83 for operating (un-locking) the rod lock mechanism 82.

According to the present embodiment, the forced parking current supply unit 83 is provided in the SBW ECU 7, which is operated by the electric power of the capacitor 73 in the case of the failure of the power supply from the main battery 71.

The forced parking current supply unit 83 may be, however, provided separately from the SBW ECU 7.

Furthermore, according to the present embodiment, the forced parking mechanism 81 and the rod-lock mechanism 82 are provided in the SBW actuator 1. However, the forced parking mechanism 81 and the rod-lock mechanism 82 may be alternatively provided at such a portion as is separated from the SBW actuator 1, and the forced parking mechanism 81 and the rod-lock mechanism 82 may drive a member (including the control rod 45) rotated together with the output shaft 17.

Figure 2A:
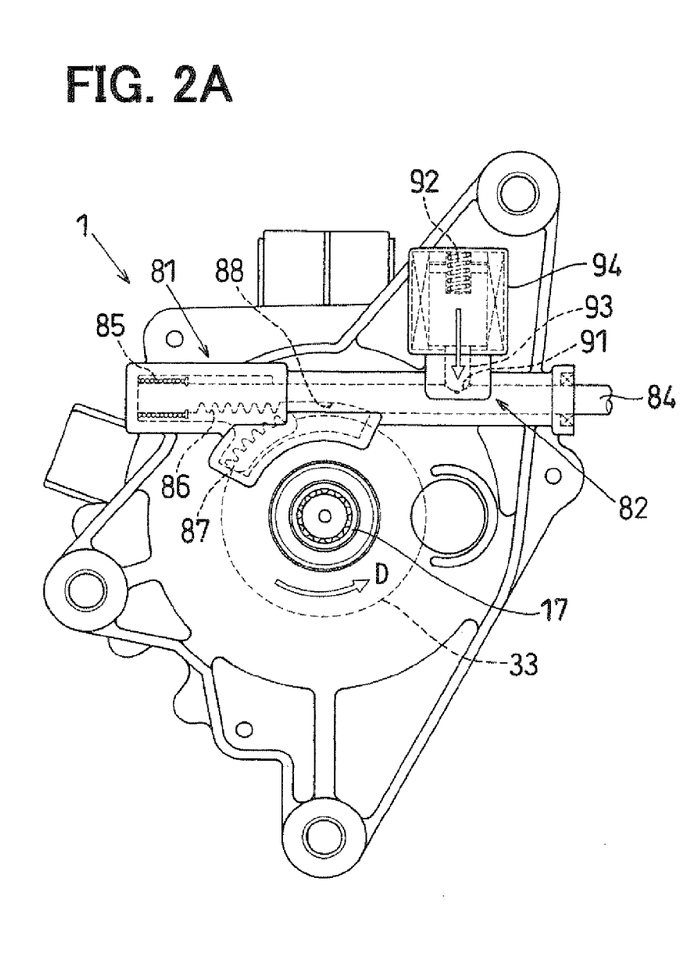
FIGS. 2A and 2B are front elevational views, respectively showing the SBW actuator which is operated in a normal condition.
Figure 2B:
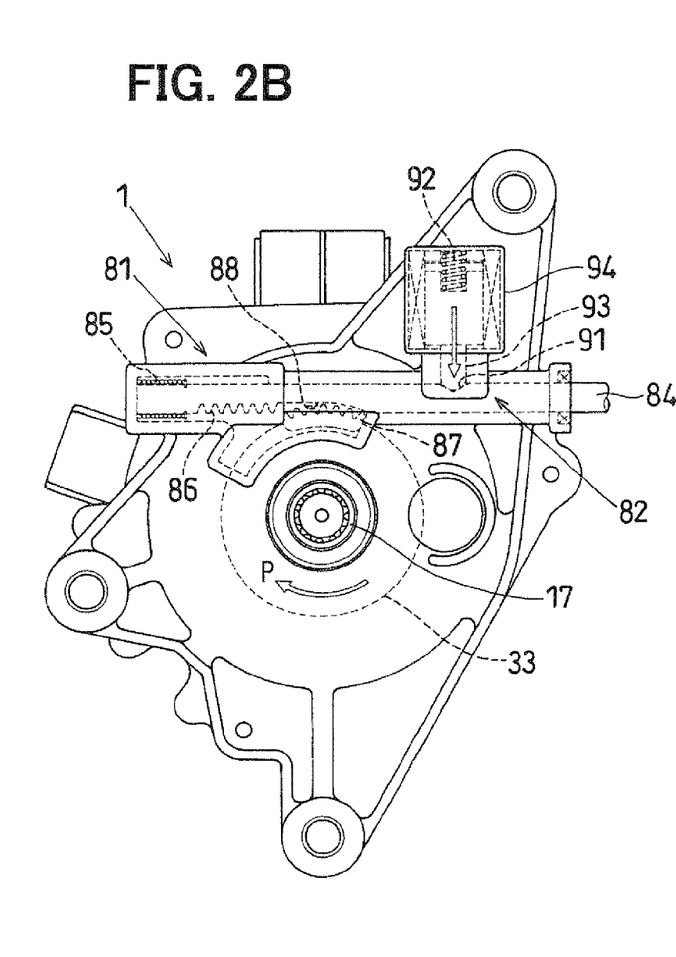

The forced parking mechanism 81 is composed of a rod 84 movable between an initial position (FIG. 2) and a final operational position (FIG. 3), a spring 85 for biasing the rod 84 toward its final operational position, and an interlocked member (33) rotated together with the output shaft 17.

According to the present embodiment, the interlocked member (33) is composed of the flanged portion 33, which is integrally provided to the output shaft 17.

The spring 85 is a compressed coil spring, which is assembled in a condition that the spring 85 is compressed by the rod 84. The biasing force of the spring 85 for biasing the rod 84 toward the final operational position is made larger than a force, which drives the parking condition setting device 4 to the parking position under a condition that a rack 86 and a pinion 87 are engaged with each other and a certain force is applied to the flanged portion 33.

The forced parking mechanism 81 does not interfere with the flanged portion 33, when the rod 84 is held at its initial position. The rod 84 is brought into engagement with the flanged portion 33, when the rod 84 is moved from the initial position to the final operational position, so that the output shaft 17 is driven to the parking setting side (the parking range) by the flanged portion 33.

More exactly, the engagement between the rod 84 and the flanged portion 33 is carried out by an engagement between the rack 86 formed on the rod 84 and the pinion 87 formed on the flanged portion 33. And a roll-off portion (a recessed portion) 88 is formed on the rod 84, in order that the rack 86 (including the rod 84 itself) does not interfere with the pinion 87 when the rod 84 is in its initial position. As a result, the output shaft 17 (including the pinion 87 and the flanged portion 33) can be freely rotated by the electric motor 5, when the rod 84 is in its initial position (FIGS. 2A and 2B).

Figure 1A:
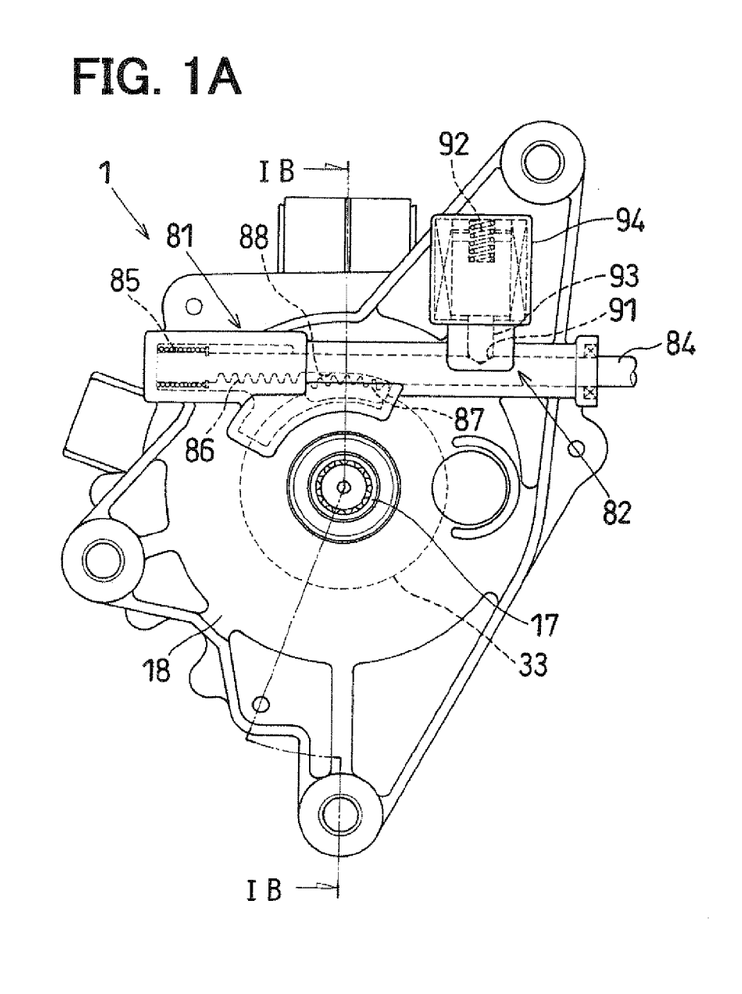
FIG. 1A is a front elevational view showing an SBW actuator according to an embodiment of the present invention.
Figure 1B:
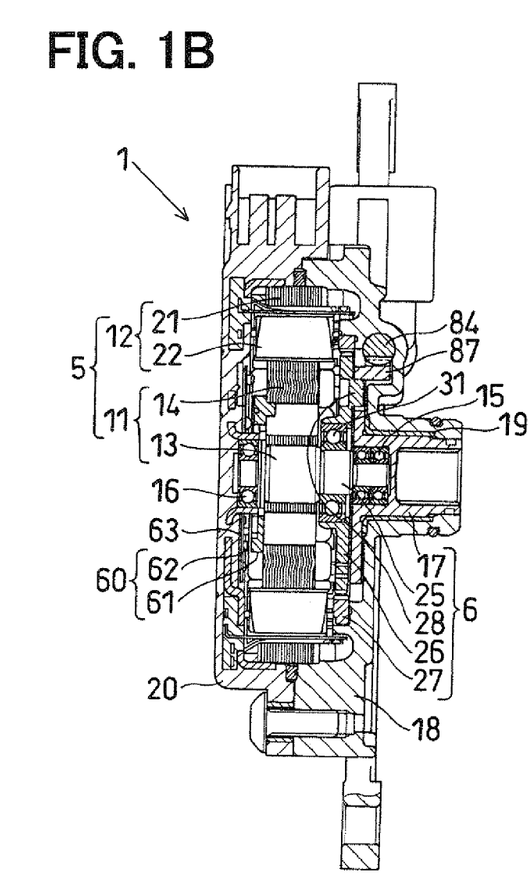
FIG. 1B is a cross sectional view taken along a line IB-IB in FIG. 1A.

An engaging pin 93, which is urged by a spring force of a return spring 92 in a downward direction of FIG. 1A, is engaged with a recessed portion 91 formed on an intermediate portion of the rod 84 (at an upper side of the rod 84 in FIG. 1A), so that the rod-lock mechanism 82 holds the rod 84 at its initial position. The engaging pin 93 is driven by an electric actuator 94. Namely, when electric current is supplied to the electric actuator 94, the engaging pin 93 is driven in a direction that the engaging pin 93 is brought out of the engagement with the recessed portion 91.

According to the embodiment, an electromagnetic solenoid is used as the electric actuator 94. The electromagnetic solenoid can drive the engaging pin 93 with a smaller electric power. When the electric current is supplied from the forced parking current supply unit 83, the electromagnetic solenoid magnetically draws the engaging pin 93 to bring the engaging pin 93 out of the engagement with the rod 84.

According to the present embodiment, the electromagnetic solenoid is explained as one of examples for driving the engaging pin 93. However, a small electric motor and a conversion mechanism for converting a rotational movement into a linear movement (such as a rack and pinion, a worm and wheel having no self-lock mechanism, a ball-screw mechanism having no self-lock mechanism, and so on) may be used for driving the engaging pin 93.

As shown in FIG. 4, the shift range control apparatus has an auxiliary battery for operating the electric actuator 94, in addition to the vehicle main battery 71. The auxiliary (additional) battery is the capacitor 73, which is charged and discharged each time when the ignition switch is turned on and off by the vehicle driver. Therefore, the capacitor 73 has a charged electric power, with which the capacitor 73 can drive the electric actuator (the electromagnetic solenoid) 94 at least one time when the failure of the current supply from the main battery 71 has occurred. The capacitor 73 for the shift range control apparatus may be commonly used as a capacitor for another vehicle system, such as a capacitor for an electrically operated brake system.

The forced parking current supply unit 83 is a controller, which supplies the electric power of the capacitor 73 (auxiliary battery) to the electric actuator 94 in the case of the failure of the electric power supply from the main vehicle battery 71 to the SBW actuator 1 (namely, in the case that the shift range can not be changed by the electric motor 5 with the power supply from the battery 71) and when a predetermined operation is carried out by the vehicle driver (for example, when a command for a forced parking operation is manually done, when the ignition key is pulled out from a key cylinder, when the vehicle driver leaves a driver seat, when a vehicle door is opened, and the like).

More exactly, the forced parking current supply unit 83 has a switch for commanding the forced parking of the vehicle, and the switch is manually operated by the vehicle driver when the failure of the electric power supply from the main vehicle battery has occurred. When the switch is turned on, the electric power is supplied from the capacitor 73 to the electric actuator 94, so as to un-lock the rod-lock mechanism 82.

Alternatively, the forced parking current supply unit 83 may be connected to the other vehicle systems different from the shift range control apparatus, and signals from those other vehicle systems (such as a signal indicating that the ignition key is pulled out from the key cylinder, a signal indicating that the vehicle driver left the driver seat, a signal indicating that the vehicle door is opened, and so on) may be inputted to the forced parking current supply unit 83. In the case of the failure of the electric power supply (in the case that the shift range can not be changed by the electric motor 5 with the power supply from the battery 71), in the case that the ignition key is pulled out from the key cylinder, the vehicle driver left the driver seat, and/or the vehicle door is opened, the electric power is supplied from the capacitor 73 to the electric actuator 94, so as to automatically un-lock the rod-lock mechanism 82.

Figure 3:
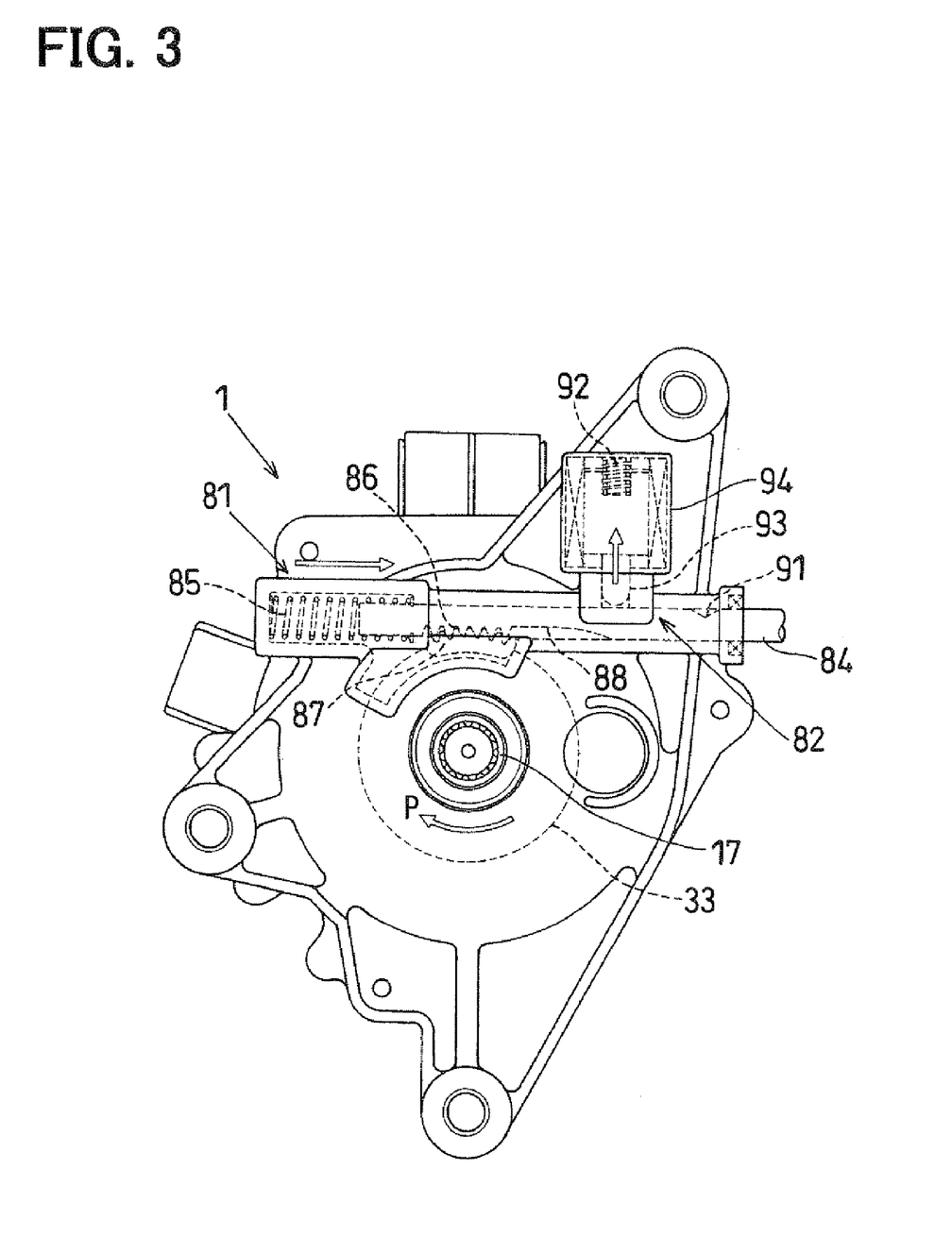
FIG. 3 is a front elevational view showing the SBW actuator which is operated in a forced parking condition.

When the electric power is supplied from the capacitor 73 to the electric actuator 94, the electric actuator 94 drives the engaging pin 93 to bring the engaging pin 93 out of the engagement with the recessed portion 91 of the rod 84, as shown in FIG. 3. The electric power supply to the electric actuator 94 is terminated in a short time period, in which the engaging pin 93 becomes out of the engagement with the rod 84. When the engaging pin 93 is disengaged from the rod 84, the rod 84 is moved by the spring force of the spring 85 from its initial position to the final operational position. Then, the rack 86 of the rod 84 is brought into engagement with the pinion 87 of the flanged portion 33, so that the flanged portion 33 as well as the output shaft 17 is forcedly rotated in a direction to the parking range. As a result, the control rod 45 is rotated in the direction to the parking side, and the locked condition (the parking condition) of the parking condition setting device is achieved.

According to the above explained first embodiment, the shift range control apparatus has the auxiliary battery (the capacitor 73) in addition to the vehicle main battery 71, so that the electric power charged in the capacitor 73 is supplied to the electric actuator 94 in the case of the failure of the electric power supply and in the case that the predetermined operation is done (such as, when the command for the forced parking operation is manually done, when the ignition key is pulled out from the key cylinder, when the vehicle driver left the driver seat, and/or when the vehicle door is opened), in order to un-lock the rod-lock mechanism 82. Then, the rod 84, the flanged portion 33, the output shaft 17 and the control rod 45 are driven by the biasing force of the spring 85, so that the locked condition (the parking condition) of the parking condition setting device 4 is achieved.

Accordingly, the necessary electric power for bringing the parking condition setting device into the parking condition can be suppressed to a smaller amount, because the parking condition setting device is driven by the spring force, wherein an initial triggering operation is carried out with a small amount of the electric power. As a result, it can be avoided that the capacitor 73 used in the case of the failure of the electric power supply will become larger in is size, and the cost thereof can be likewise suppressed to a lower value.

In addition, the capacitor 73 is used as the auxiliary battery. The cost for such auxiliary battery can be also suppressed to a lower value. Since the capacity for the capacitor 73 can be made smaller, the capacitor 73 can be commonly used as a capacitor for other vehicle systems, which makes further the cost for the apparatus smaller.

A manual lever 95 (in FIG. 4) for releasing the parking condition is provided in the forced parking device of the shift range control apparatus, wherein the rod 84 is moved back to its initial position by the manual operation of the manual lever 95. The manual lever 95 is mechanically linked with rod 84, so that the rod 84 is moved (pushed, and/or rotated) in a predetermined direction back to the initial position. Then, the rod-lock mechanism 82 is brought into the locked condition.

The manual lever 95 is located at such a position, at which the manual lever 95 can be manually operated by the vehicle driver, and which can not be generally seen from the vehicle driver.

It becomes more difficult for a third person to release the parking condition, when the forced parking mechanism 81 is operated and the vehicle is in the parking condition. Accordingly, a countermeasure against a possible vehicle theft of the vehicle in the parking condition can be strengthened.

In addition, the manual lever 95 may be operated only when a mechanical or electronic identification is verified. For example, the manual lever 95 is arranged in a box, which can be opened by a mechanical or electronic key to be verified.

As above, it is quite difficult for the third person to release the parking condition, when the forced parking mechanism 81 is operated and the vehicle is in the parking condition.

(Modifications)

In the above embodiment, the electric actuator 94 is driven by the forced parking current supply device 83 so as to un-lock the rod-lock mechanism 82. However, the engaging pin 93 may be so arranged that the engaging pin 93 can be manually operated to un-lock the rod-lock mechanism 82.

According to such a modification, the rod-lock mechanism 82 can be manually locked and/or un-locked, so that the forced parking device can be manually brought into and/or brought out of the parking condition, when the failure of the electric power supply has occurred.

In the above embodiment, the rod-lock mechanism 82 is un-locked by the use of the auxiliary battery (capacitor 73) in the case of the failure of the electric power supply, so that the vehicle is brought into the parking condition. However, the rod-lock mechanism 82 may be driven when any signal of a security system mounted in the vehicle is generated, in order to un-lock the rod-lock mechanism 82.

Since the vehicle is brought into the parking condition by operating the rod 84 of the forced parking mechanism 81, without driving (without supplying the electric power to) the electric motor 5 of the SBW actuator 1, a function for the vehicle security is enhanced.

In the above embodiment, the encoder 60 is used. It may be also possible to remove the encoder 60 and instead to control the rotational number and the rotational angle of the rotor 11 by counting the number of current supply to the respective excitation coils 22.

In the above embodiment, the current shift range is recognized based on the rotational number and the rotational angle of the rotor 11, which are detected by the encoder 60. It may be also possible to recognize the current shift range by use of an angular sensor, which detects an angular position of the output shaft 17 of the speed reduction device 6.

In the above embodiment, the SR motor is used as one example for the electric motor 5. However, any other types of the motors, for example, a reluctance motor such as a synchronous reluctance motor, or a permanent magnet synchronous motor such as a synchronous motor (SPM) of a surface magnet structure type, a synchronous motor (IPM) of an embedded magnet structure type or the like, may be used.

In the above embodiment, the speed reduction device 6 is explained as the cycloid speed reduction device, which is one kind of the planetary gear train. However, a planetary gear train, which has a sun gear 26 driven by the rotor shaft 13, multiple planetary pinions arranged around the sun gear 26 at equal distances, and a ring gear engaged with the planetary pinions, may be also used.

Furthermore, another type of speed reduction device, which has a sun gear 26 driven by the rotor shaft 13, and multiple lines of gears engaged with the sun gear 26, may be also used.

What is claimed is:

1. A shift range control apparatus for a vehicle automatic transmission comprising:
    a shift range changing mechanism for changing a shift range of the automatic transmission;
    a parking condition setting mechanism for changing a parking condition of the vehicle from a parking setting position to a parking releasing position and vice versa;
    a shift-by-wire actuator for switching an operational mode from the shift range changing mechanism to the parking condition setting mechanism and vice versa;
    a forced parking mechanism having;
        a rod movably supported between an initial position and a final operational position;
        a spring for biasing the rod toward the final operational position; and
        an interlocked portion rotated together with an output shaft of the shift-by-wire actuator,
        wherein the rod does not interfere with the interlocked portion when the rod is in the initial position, whereas the rod is brought into engagement with the interlocked portion when the rod is moved from the initial position to the final operational position, so that the interlocked portion and the output shaft are driven to the parking setting position;
    a rod-lock mechanism having;
        an engaging pin engaged with the rod when the rod is in the initial position and for holding the rod in the initial position; and
        an electric actuator for driving the engaging pin when electric power is supplied, so that the engaging pin is brought out of engagement from the rod;
    a forced parking current supply unit for controlling supply of the electric power to the electric actuator.

2. The shift range control apparatus according to claim 1, further comprising:
    an auxiliary battery in addition to a vehicle main battery for driving the electric actuator,
    wherein the forced parking current supply unit supplies electric power charged in the auxiliary battery to the electric actuator in the case;
    that a failure of electric power supply from the vehicle main battery to the shift-by-wire actuator has occurred, and
    that one of the following has occurred;
        a command for a forced parking operation is manually done;
        an ignition key is pulled out from a key cylinder;
        a vehicle driver has left a driver seat; and
        a vehicle door is opened.

3. The shift range control apparatus according to claim 2, wherein
    the auxiliary battery is composed of a capacitor which charges electric charge when electric voltage is applied thereto,
    the electric charge for the capacitor is charged or discharged each time when an ignition key switch is turned on or turned off by an operation of the vehicle driver,
    the capacitor has charged electric power enough to drive the electric actuator with one discharge operation of the charged electric power, when the failure of electric power supply from the vehicle main battery to the shift-by-wire actuator has occurred.

4. The shift range control apparatus according to claim 3, wherein
    the capacitor is commonly used as a capacitor for another vehicle system.

5. The shift range control apparatus according to claim 1, wherein
    the forced parking current supply unit supplies the electric power to the electric actuator from one of the vehicle main battery and the auxiliary battery, in the case that a command signal for a forced parking operation is applied to the forced parking current supply unit from a security system mounted on the vehicle.

6. The shift range control apparatus according to claim 1, further comprising:
    a manual lever for manually pushing back the rod from the final operational position to the initial position,
    wherein the manual lever is located at such a position, at which the manual lever can be manually operated by a vehicle driver, and which can not be generally seen from the vehicle driver.

7. The shift range control apparatus according to claim 6, wherein
    the manual lever can be operated only when a mechanical or electronic identification is verified.

* * * * *